3,418,760
METHOD AND APPARATUS FOR MAKING INDEX
PLATES, MASTER GEARS, AND THE LIKE
Alfred W. Klomp, Detroit, Mich., assignor to Gary
Tool, Inc., Madison Heights, Mich., a corporation of
Michigan
Filed May 24, 1965, Ser. No. 458,108
19 Claims. (Cl. 51—157)

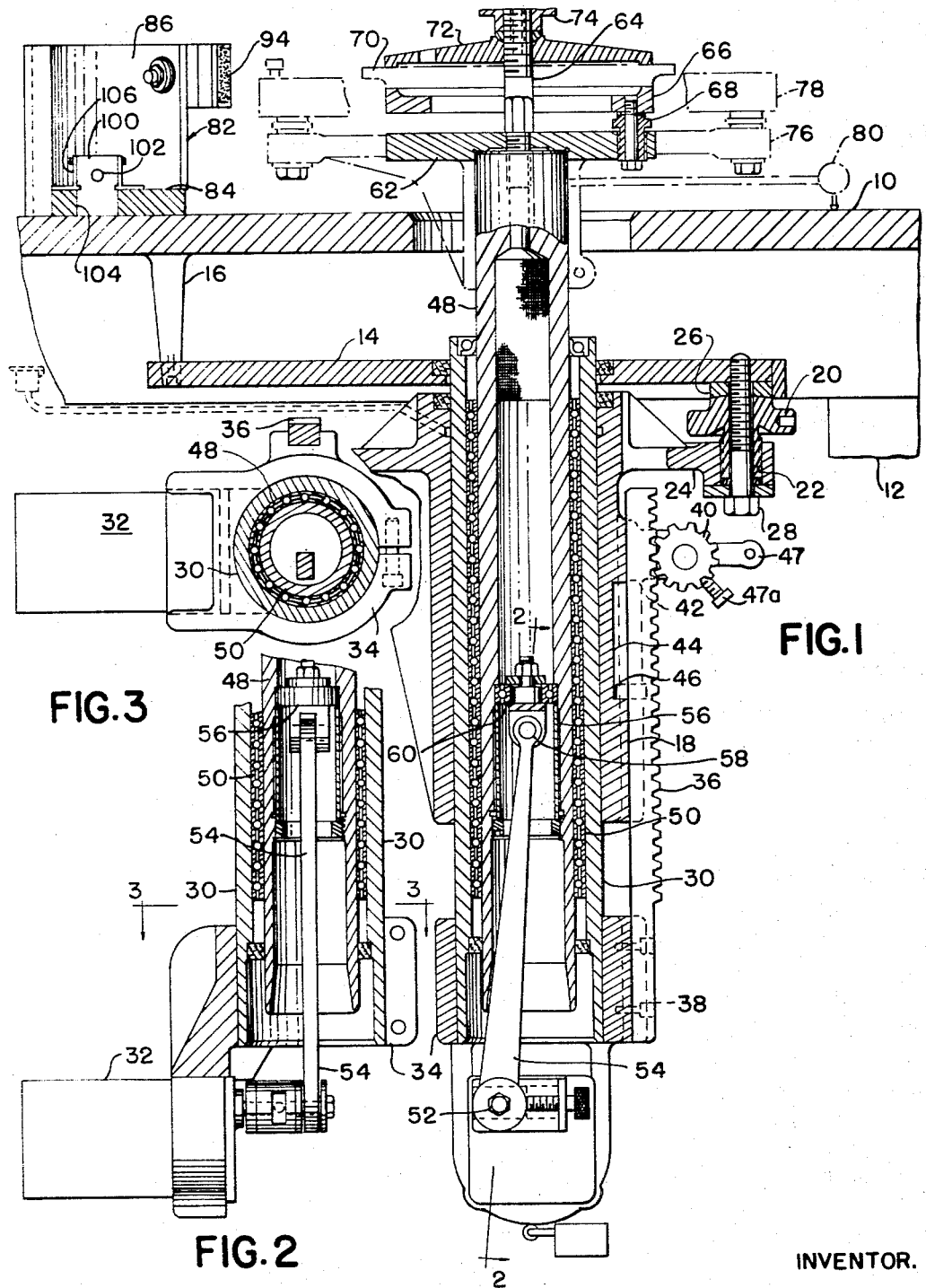
Dec. 31, 1968     A. W. KLOMP     3,418,760
METHOD AND APPARATUS FOR MAKING INDEX PLATES, MASTER
GEARS, AND THE LIKE
Filed May 24, 1965
INVENTOR.
ALFRED W. KLOMP
ATTORNEYS

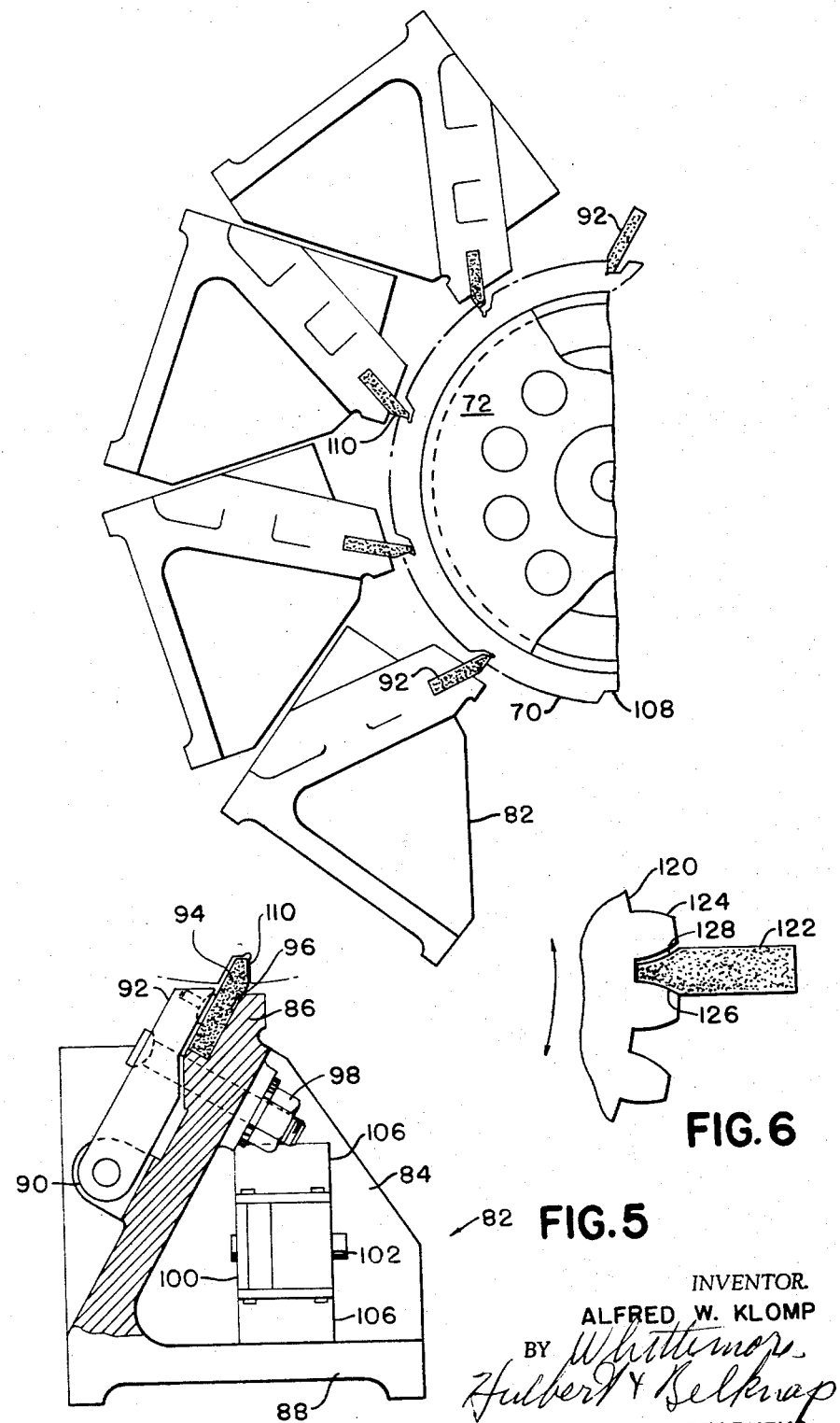

ABSTRACT OF THE DISCLOSURE

Apparatus for finishing toothed members comprising a planar support, a work support, a multiplicity of individually adjustable abrasive holders, abrasive elements carried by the holders each having an abrasive surface conforming to a tooth surface of the toothed member, and means for locking the holders to the planar support. The two holders are relatively reciprocable in a direction parallel to the axis of the toothed member and are relatively angularly movable about the axis of the toothed member. The supports are indexable to apply the action of each abrasive element to a multiplicity of teeth.

---

It is an object of the present invention to provide a method and apparatus capable of producing index plates, master gears and the like, characterized by the extreme accuracy as to spacing of the locating surfaces.

It is a further object of the present invention to provide a method and apparatus operable on an index plate finished to present high standards of tolerance to improve the accuracy thereof.

It is a further object of the present invention to provide a method and apparatus employing axial reciprocation of an index plate with respect to a plurality of honing elements individually adjusted into tangent relationship with selected locating surfaces of the index plate while applying a light torque causing some of the locating surfaces to bear against such locating surfaces, and repeatedly indexing the index plate to cause the honing elements to operate against successions of locating surfaces.

More specifically, it is an object of the present invention to provide apparatus of the character described comprising a surface plate, means for mounting an index plate with its axis exactly perpendicular to the surface plate, means for reciprocating the index plate axially relative to the surface plate, means providing for rotation of the index plate on its axis, and a multiplicity of individually adjustable honing elements on said surface plate.

It is a further object of the present invention to provide apparatus as described in the preceding paragraph in which the individual honing elements are mounted in holders having locating surfaces exactly perpendicular to the abrading surfaces of the honing elements, and means for locking the holders in precisely adjusted position on the surface plate.

It is a further object of the present invention to provide apparatus as described in the preceding paragraph in which the means for locking the individual holders in precisely adjusted position on the surface plate comprises magnetic means carried by each of said holders, and means for adjusting the effectiveness of the magnetic means.

Other objects and features of the invention will become apparent as the description proceeds, especially when taken in conjunction with the accompanying drawings, illustrating a preferred embodiment of the invention, wherein:

FIGURE 1 is a vertical sectional view of the improved apparatus for making index plates.

FIGURE 2 is a fragmentary sectional view on the line 2—2, FIGURE 1.

FIGURE 3 is a sectional view on the line 3—3, FIGURE 2.

FIGURE 4 is a fragmentary plan view showing the relationship between the index plate and the honing elements.

FIGURE 5 is an enlarged plan view, partly in section, of a single holder for abrasive elements.

FIGURE 6 is a fragmentary plan view illustrating the application of the invention to a gear member.

Referring now to the drawings, the apparatus comprises a surface plate 10 suitably mounted on support structure which may be in the form of legs 12. The surface plate is preferably connected to a rigid hanger plate 14 by suitable means, such for example as legs or struts 16. The foregoing structure comprises a rigid support having a highly accurate upper surface and is the structure from which all other parts of the mechanism are located.

Suspended from the hanger plate 14 is a tubular column 18 and means are provided for adjusting the column 18 so that its longitudinal axis is exactly perpendicular to the surface plate 10. This means comprises jack screw mechanism including the screw 20 externally threaded for engagement in a threaded opening 22 located adjacent the periphery of a radially extending flange 24 formed on the column 18. Intermediate the upper end of the screw 20 and the under surface of the hanger plate 14 is a spherical washer 26 the lower surface of which is spherically formed and conforms to a similarly spherically formed upper end portion on the screw 20. A clamp screw 28 is threaded into the hanger plate 14 and serves to lock the column 18 in adjusted position. It will of course be appreciated that three jack screw devices each including a jack screw 20 are provided so that the column 18 may be brought into an exactly perpendicular relationship to the surface plate or into an exactly vertical position if the surface plate is horizontal, as is intended.

Vertically adjustable in the column 18 is a tubular ram 30 which at its lower end carries a motor 32, the motor being secured to the ram 30 by a clamping collar 34. The ram 30 has a rack 36 secured thereto as by screws 38, the rack being in meshed engagement with a pinion 40 carried by the laterally extending mounting 42 on the column 18. The column 18 is provided with a vertical groove 44, and a pin 46 carried by the rack 36 extends into the groove and serves to limit vertical adjustment of the ram 30 relative to the column 18. Suitable means such as crank 47 for effecting rotation of the pinion and a clamp or the like 47a for locking the ram in its vertically adjusted position, are provided.

Mounted in the hollow interior of the ram for both vertical movement and for rotation about its vertical axis is a spindle 48. An elongated ball bearing assembly 50 is interposed between the ram and the spindle, its length insuring retention of the spindle in accurate alignment of the ram at all times.

The motor 32 has an adjustable throw crank 52 connected by a connecting rod 54 to the spindle 48. The connection is to a driver 56 through a pivot pin 58, the driver being connected to the spindle 48 by a bearing 60.

A face plate 62 has a central recess fitting over the upper end of the spindle 48 and taking location from the flat upper end thereof as well as on the cylindrical surface just below the upper end of the spindle. The face plate 62 is clamped in position by means of an elongated connector element 64 the lower end of which is threaded as illustrated and extends into a tapped opening in the upper end of the spindle 48.

Carried by the face plate 62 is an annular adapter 66 which is adjustable relative to the face plate 62 by three jack screws one of which is indicated at 68. An index plate 70 rests on the adapter 66 and is clamped in position thereon by clamping plate 72 through the agency of a nut 74.

If a larger index plate is to be operated on, a larger face plate, indicated in dot and dash lines at 76, is provided which in turn carries a correspondingly larger annular adapter 78.

In order to check alignment a sensitive indicator shown in dot and dash lines at 80, may be connected to the upper end of the spindle 48 and the spindle rotated through 360 degrees to observe movement of the pointer on the indicator.

Referring now particularly to FIGURES 1, 4 and 5, there are shown a plurality of independently adjustable holders 82 one of which is shown in approximately operative position on the surface plate 10 in FIGURE 1. The holders 82 are formed of three plate-like sections, a bottom plate 84, a honing element holding plate 86, and a third plate portion 88. These plate-like portions are all formed integrally and the plate portion 88 constitutes means for insuring rigidity.

The honing element holding plate 86 as best illustrated in FIGURE 5, is provided with ear means 90 carrying a pivoted clamping arm 92 which is adapted to clamp a honing element 94 in a recess 96 formed at one side of the honing element holding plate 86. A clamping screw and nut indicated generally at 98 serves to operate the arm 92 to clamp the abrasive or honing element in the illustrated position.

In order to provide for accurate placement of the honing element in adjusted position and to retain it firmly supported in adjusted position, magnetic holding means are provided. The magnetic holding means comprises a magnet block 100 having a push button 102 extending therethrough which when pushed in one direction neutralizes the magnetic field established by permanent magnets in the block, and when pushed in the opposite direction causes these elements to exert their maximum magnetic attraction. The block 100 extends through an opening 104 provided in the bottom plate 84 of the holder and is retained in position by a pair of brass angle plates 106 bolted or otherwise fixedly secured to sides of the magnet block 100 and adapted to be suitably attached to the upper surface of the plate portion 84 of the holder. In practice, the magnet block is originally assembled in the opening 104 so that it extends slightly therethrough, after which the entire lower surface of the plate portion 84 is machined to effect flatness, including the protruding surface of the magnet.

The present invention is characterized by its ability to produce accuracy in an index plate which in many cases exceeds the ability to measure any residual error. Accordingly, it is essential that the honing elements 94 must have the operating surface thereof in exact perpendicular relationship to the upper gauge surface of the surface plate 10. This of course is accomplished by careful mounting of the honing element and more particularly, in trimming it into the required relationship while the honing element and holder are supported on a flat gauge surface engaging the lower surface of the plate portion 84.

In operation, after the parts have been adjusted so that the axis of reciprocation and rotation of the spindle 48 is exactly perpendicular to the gauge surface of the surface plate 10, an index plate such as the plate 70 is positioned on the adapter 66, or in the case of a larger index plate on the adapter 78, after which the index plate is clamped in adjusted position by means of the clamping plate 72. Parallelism of the index plate relative to the surface plate 10 may of course be insured by suitable adjustment of the jack screws 68.

At this time a plurality of the holders 82 are moved on the surface plate 10 so that the honing elements 94 thereof extend into the notches 108 with the honing surfaces 110 thereof in engagement with the locating surfaces of the index plate 70. This may be readily accomplished without the possibility of spring-back due to the use of the magnetic holders. The buttons 102 may be manipulated so that the magnetic attraction permits movement of the holder, but is effective to retain the holder in adjusted position when adjusting pressure is released. At this time a number of honing elements are brought into position so that the perfectly flat operating surfaces 110 thereof are just in surface-to-surface contact with the locating surfaces of the index plate. It is important to note that no checking, measuring, or gauging of the index plate is required except to see that it preferably is of good commercial quality. No effort is made to position the honing elements in accurately spaced relationship. Instead, the position of the honing elements is caused to conform precisely to the location of the gauging surfaces of the index plate. Thus, if any particular gauging surface of the plate is out of the position which it theoretically should occupy, then the corresponding honing element is similarly out of its theoretically correct position.

It is not necessary to provide a honing element for each locating surface and in most cases the size of the holders precludes positioning a honing element in each of the locating notches of the index plate. Preferably however, the honing elements are disposed at substantially uniform circumferential spacing.

After the honing elements have been carefully moved into operating position and the individual buttons 102 thereof pressed to provide a secure locking engagement of the holder on the surface plate, the index plate is raised as for example by operation of the pinion 40, to a position of vertical clearance with respect to the honing elements, and is rotated preferably one notch and is then lowered into operating position. At this time the motor 32 is started resulting in a vertical reciprocation of the index plate. The operator at this time, preferably by hand pressure, rotates the index plate in a direction to cause some of the locating surfaces to cooperate with the honing elements located in the notches adjacent thereto. After a moderate honing operation under very light finger controlled pressure, indexing is repeated and the operation is continued until a final honing operation results in a uniform removal of a color indication on all of the locating surfaces. It is found that the honing operation required to bring all of the locating surfaces into the correct spacing requires a considerable time and may require many step-by-step indexed rotations of the index plate.

The amount by which the index plate is turned or indexed after each individual honing operation cannot be predetermined but experience will indicate to the operator the amounts conducive to the best results. In some cases for example, the index plate may be indexed approximately 90 degrees, 180 degrees, or in other cases it may be indexed by one notch, two notches, or a few notches in a predetermined series relationship.

The results obtained are due to the fact that material is removed from the honing elements and from the locating surfaces of the index plate simultaneously. Furthermore, the amount of material removed from the honing elements and from the locating surfaces of the index plates is a function of the misplacement of such surfaces. Ultimately, a condition is reached in which all of the abrading surfaces of the honing elements approach the theoretically desired spacing while at the same time the locating surfaces of the index plate also approach the theoretically correct location. At this time of course, a final check is obtained by cleaning the index plate and applying a color coating to the locating surfaces thereof, after which a limited honing cycle will remove the color coating uniformly and simultaneously from all of the locating surfaces of the plate. That this condition has in fact been reached may be verified by repeating the test one or more times with a fresh color coating provided on the locating surfaces of the index plate and with the index plate rotated substantially into new positions with respect to the abrading or honing elements. If these subsequent tests remove the color coating uniformly and evenly with minimum honing action then the index plate is in fact finished as accurately as possible.

It is to be understood that the present method is not intended to remove large quantities of stock and in fact, the invention at present is expected to find its most useful field of application in the improvement of index plates already manufactured to the highest degree of perfection now available. On the contrary of course, the apparatus and method disclosed herein may be used with a somewhat coarser abrasive to accomplish a greater removal of metal from the index plate.

In the foregoing description of a preferred embodiment of the present invention, reference has been made to improving the accuracy of locating surfaces on an index plate. The present invention is characterized in the extreme accuracy in the formation of locating surfaces on an index plate and it is in this field that it is anticipated it will find its greatest utility. However, it is apparent that the present invention may be used for finishing other toothed elements such for example as a cylindrical gear having tooth surfaces of involute or other form, or splined members.

It will further be apparent that the method and apparatus disclosed herein can be used for finishing both sides of the notches or tooth spaces, as best indicated in FIGURE 6. In this figure there is illustrated a portion of a cylindrical gear 120 associated with a plurality of abrading elements 122, only one of which is illustrated in the figure. As illustrated, the teeth 124 of the gear are formed with involute profiles and the surfaces 126 and 128 of the abrading or honing element are also provided with involute surfaces. With this arrangement it is apparent that both sides of the tooth spaces may be processed by torquing the cylindrical member alternately in opposite directions.

The present invention is particularly useful in the formation of members requiring great accuracy, and master gears and gauges can be advantageously processed as disclosed herein. Accordingly, the surfaces which are finished by the method and apparatus disclosed herein are referred to as generally radially extending surfaces on a cylindrical toothed member and it is to be understood that this language includes not only radial surfaces of index plates, but also tooth surfaces as illustrated in FIGURE 6.

The drawings and the foregoing specification constitute a description of the improved method and apparatus for making cylindrical toothed members such as index plates, gauges, master gears and the like in such full, clear, concise and exact terms as to enable any person skilled in the art to practice the invention, the scope of which is indicated by the appended claims.

What I claim as my invention is:

1. The method of improving the accuracy of spacing of generally radially extending surfaces on a cylindrical toothed member which comprises individually positioning a plurality of separately movable abrasive elements each having a surface shaped to conform to the desired tooth surfaces on a toothed member in an array in which all of said abrasive surfaces are in surface contact with tooth surfaces located at intervals around the periphery of the member, repeatedly relatively indexing the member and the array of abrasive elements so that the abrasive elements operate on different ones of the locating surfaces, and relatively reciprocating the member and elements in the direction of the axis of the member between successive index operations with the surface and elements in light pressure contact.

2. The method of claim 1 which comprises alternately indexing and relatively reciprocating said member and elements until a reciprocation cycle is effective to remove a color indication uniformly from all locating surfaces, and at that time discontinuing the operation.

3. The method of improving the accuracy of spacing of generally radially extending surfaces on a cylindrical toothed member which comprises locating a cylindrical toothed member exactly parallel to a horizontal surface plate, adjusting separately movable holders each having an abrasive surface shaped to conform to generally radially extending surfaces of the teeth on said member on said surface plate into an array in which all of said abrasive surfaces are in surface contact with said surfaces on said member and locking said holders in position, alternately indexing said member relative to the array of said holders and reciprocating said member exactly perpendicular to said surface plate with the said surfaces thereof in light pressure contact with the abrasive surfaces on said holders, and continuing the operation while maintaining the abrasive holders in the initially adjusted position until uniformity of the spacing of the said surfaces has been improved.

4. The method of improving the accuracy of spacing of locating surfaces on an index plate which comprises individually positioning a plurality of flat abrasive elements in surface contact with locating surfaces located at intervals around the periphery of the plate, relatively indexing the plate and abrasive elements so that the abrasive elements operate on different ones of the locating surfaces, and relatively reciprocating the plate and elements in the direction of the axis of the plate between successive index operations with the surface and elements in light pressure contact.

5. The method of improving the accuracy of spacing of locating surfaces on an index plate which comprises locating a surface plate exactly parallel to a horizontal surface plate, individually adjusting abrasive holders having plane abrasive surfaces on said surface plate to bring said plane abrasive surfaces into surface contact with locating surfaces on said index plate and locking said holders in position, alternately indexing said index plate relatve to said holders and reciprocating said index plate exactly perpendicular to said surface plate with the locating surfaces thereof in light pressure contact with the plane abrasive surfaces on said holders, and continuing the operation while maintaining the abrasive holders in the initially adjusted position until uniformity of the spacing of the locating surfaces has been improved.

6. Finishing apparatus for generally cylindrical toothed members comprising a surface plate, a column, means interconnecting said column and plate for relative angular adjustment to provide for exact perpendicular relationship between said plate and column, a spindle reciprocable axially of said column and rotatable relative thereto, a plurality of individually adjustable abrasive element holders on said plate, and means for locking said holders in adjusted position on said plate.

7. Apparatus as defined in claim 6 in which said column is tubular, and said spindle is positioned in said column by an elongated tubular ball bearing assembly.

8. Apparatus as defined in claim 7 in which a tubular ram is longitudinally movable in said column, and in which said spindle is mounted within said ram.

9. Apparatus as defined in claim 6 in which said surface plate is made of magnetic material, and said holders are provided with magnetic blocks, and means for individually adjusting the strength of the magnetic attraction exerted by said blocks.

10. Finishing apparatus for generally cylindrical toothed members comprising a surface plate, means for supporting said plate is horizontal position, a column suspended from said plate, adjustable suspension means connecting said column and plate to provide for adjustment of said column into exactly perpendicular relationship with respect to said plate, a spindle carried by said column for axial reciprocation and rotational movement relative thereto, drive means connected between said column and spindle to reciprocate said spindle, means on said spindle above said plate for supporting an index plate in horizontal position, a plurality of individually adjustable abrasive holders on said plate and indvidually operable means for locking each of said holders in adjusted position.

11. Apparatus as defined in claim 10 in which said column is tubular, and said spindle is supported within said column.

12. Apparatus as defined in claim 11 in which a vertically movable ram is positioned within said column, and said spindle is mounted within said ram.

13. Apparatus as defined in claim 12 comprising an elongated tubular ball bearing device supporting said spindle within said ram.

14. Apparatus as defined in claim 12 in which the means for reciprocating said spindle comprises a motor suspended from the lower end of said ram and is vertically movable therewith.

15. Apparatus as defined in claim 14 comprising a rack and pinion device connected between said column and said ram to shift said ram, spindle and an index plate supported on said spindle upwardly above abrasive holders on said surface plate for indexing of said index plate relative to said holders.

16. Apparatus as defined in claim 10 comprising a support plate connected to the upper end of said spindle, an annular work supporting adapter, and adjustable means connecting said adapter to said support plate to insure parallelism between said adapter and said surface plate.

17. Apparatus as defined in claim 10 in which said holders each is provided with an adjustable magnetic device to lock it magnetically in exactly adjusted position to said surface plate.

18. Finishing apparatus for substantially eliminating index error in toothed members which comprises a planar support, a work support for supporting a toothed member in parallelism with said planar support, a plurality of abrasive element holders each provided with an abrasive element having an abrasive surface conforming to tooth surfaces of the toothed member, said holders being individually adjustable on said planar support into an array in which the abrasive surfaces of the abrasive elements thereof are in surface contact with corresponding tooth surfaces of teeth of said toothed member, means associated with each holder for individually locking each holder in adjusted position, means for effecting relative reciprocation between said array of holders and the toothed member in a direction parallel to the axis of the toothed member, means providing for relative angular movement between said array of holders and the toothed member about the axis of the member to apply pressure between the abrasive elements and teeth, and means for relatively indexing said array of holders and the toothed member to apply the action at each abrasive element to a multiplicity of teeth.

19. Apparatus as defined in claim 18 in which said planar support is a horizontal surface plate, and the means for locking each holder in position comprises selectively energizable magnetic means.

References Cited
UNITED STATES PATENTS

| | | | |
|---|---|---|---|
| 1,559,908 | 11/1925 | Parsons et al. | 51—287 |
| 1,683,868 | 9/1928 | Copland et al. | 51—59 |
| 1,881,382 | 10/1932 | Wildhaber | 51—157 |
| 1,988,025 | 1/1935 | Trendell | 51—59 |
| 2,655,771 | 10/1953 | Kline | 51—1957 X |

LESTER M. SWINGLE, *Primary Examiner.*

U.S. Cl. X.R.

51—287